United States Patent
Obuchi et al.

(10) Patent No.: US 12,030,580 B2
(45) Date of Patent: Jul. 9, 2024

(54) OPERATING DEVICE FOR HUMAN-POWERED VEHICLE

(71) Applicant: SHIMANO INC., Sakai (JP)

(72) Inventors: Kohei Obuchi, Sakai (JP); Yu Kato, Sakai (JP); Kazuma Mori, Sakai (JP); Nobuyoshi Fujii, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 18/083,570

(22) Filed: Dec. 19, 2022

(65) Prior Publication Data

US 2023/0257060 A1 Aug. 17, 2023

(30) Foreign Application Priority Data

Feb. 17, 2022 (DE) ............ 10 2022 103 695.2

(51) Int. Cl.
| | |
|---|---|
| *B62K 23/06* | (2006.01) |
| *B60T 7/10* | (2006.01) |
| *B60T 11/18* | (2006.01) |
| *B62L 3/02* | (2006.01) |

(52) U.S. Cl.
CPC ............ *B62K 23/06* (2013.01); *B60T 7/102* (2013.01); *B60T 11/18* (2013.01); *B62L 3/023* (2013.01)

(58) Field of Classification Search
CPC ......... B60T 7/102; B60T 11/18; B62K 23/06; B62L 3/023
See application file for complete search history.

(56) References Cited

U.S. PATENT DOCUMENTS

| | | | |
|---|---|---|---|
| 2015/0266540 A1* | 9/2015 | Snead | B62L 3/023 188/344 |
| 2017/0106939 A1* | 4/2017 | Snead | B62L 1/005 |
| 2021/0061407 A1* | 3/2021 | Kosaka | B62K 23/06 |
| 2021/0362802 A1* | 11/2021 | Obuchi | F16J 1/008 |
| 2021/0362803 A1* | 11/2021 | Obuchi | B60T 11/236 |
| 2022/0185426 A1* | 6/2022 | Dunlap | B62K 23/06 |

* cited by examiner

*Primary Examiner* — Kenneth Bomberg
*Assistant Examiner* — Matthew Wiblin
(74) *Attorney, Agent, or Firm* — MORI & WARD, LLP (57) ABSTRACT

An operating device for a human-powered vehicle comprises a base, a piston, an operating member, an intermediate member, and a mounting structure. The base includes a hole. The piston is movably provided in the hole. The operating member is pivotally coupled to the base about a first pivot axis. The intermediate member is pivotally coupled to the base about a second pivot axis to transmit a pivotal movement of the operating member to the piston. The mounting structure is configured to couple the base and a handlebar of the human-powered vehicle. The mounting structure defines a mounting axis extending along the handlebar in a mounting state where the mounting structure couples the base and the handlebar. The first pivot axis is closer to the mounting axis than the second pivot axis in a perpendicular direction perpendicular to the mounting axis as viewed along the first pivot axis.

19 Claims, 6 Drawing Sheets

OPERATING DEVICE FOR HUMAN-POWERED VEHICLE

The present application claims priority under 35 U.S.C. § 119 to German Patent Application No. 10 2022 103 695.2, filed Feb. 17, 2022. The contents of German Patent Application No. 10 2022 103 695.2 are incorporated herein by reference in their entirety.

BACKGROUND

Technical Field

The present invention relates to an operating device for a human-powered vehicle.

Background Information

A human-powered vehicle includes an operating unit configured to operate an operated device. The operating unit includes a base part and an operating part pivotally coupled to the base part about a pivot axis. The operated device is configured to be actuated when the operated unit is operated by a user. It is preferable to make a movement of the operating part suitable for a movement of the user's fingers.

SUMMARY

In accordance with a first aspect of the present invention, an operating device for a human-powered vehicle comprises a base, a piston, an operating member, an intermediate member, and a mounting structure. The base includes a hole. The piston is movably provided in the hole. The operating member is pivotally coupled to the base about a first pivot axis. The intermediate member is pivotally coupled to the base about a second pivot axis to transmit a pivotal movement of the operating member to the piston. The mounting structure is configured to couple the base and a handlebar of the human-powered vehicle. The mounting structure defines a mounting axis extending along the handlebar in a mounting state where the mounting structure couples the base and the handlebar. The first pivot axis is closer to the mounting axis than the second pivot axis in a perpendicular direction perpendicular to the mounting axis as viewed along the first pivot axis.

With the operating device according to the first aspect, since the first pivot axis is closer to the mounting axis than the second pivot axis in the perpendicular direction as viewed along the first pivot axis, it is possible to make a movement of the operating member suitable for a movement of user's fingers. Thus, it is possible to improve operability of the operating device.

In accordance with a second aspect of the present invention, the operating device according to the first aspect is configured so that the hole has a cylinder axis and extends along the cylinder axis. The first pivot axis is provided between the mounting axis and the cylinder axis of the hole as viewed along the first pivot axis.

With the operating device according to the second aspect, it is possible to put the first pivot axis reliably closer to the mounting axis in the perpendicular direction. Thus, it is possible to make the movement of the operating member reliably suitable for the movement of user's fingers, improving operability of the operating device.

In accordance with a third aspect of the present invention, the operating device according to the first or second aspect is configured so that the hole has a cylinder axis and extends along the cylinder axis. The second pivot axis is provided between the mounting axis and the cylinder axis of the hole as viewed along the first pivot axis.

With the operating device according to the third aspect, it is possible to make the operating device smaller.

In accordance with a fourth aspect of the present invention, the operating device according to any one of the first to third aspects is configured so that the hole has a cylinder axis and extends along the cylinder axis. The cylinder axis is inclined relative to the mounting axis as viewed along the first pivot axis.

With the operating device according to the fourth aspect, it is possible to make the operating device smaller.

In accordance with a fifth aspect of the present invention, the operating device according to any one of the first to fourth aspects further comprises a reservoir including a reservoir chamber. The base and the piston define a hydraulic chamber in the hole. The reservoir chamber is configured to be in communication with the hydraulic chamber. The reservoir chamber is closer to the mounting axis than the hydraulic chamber in the perpendicular direction as viewed along the first pivot axis.

With the operating device according to the fifth aspect, it is possible to utilize a space between the base and the mounting axis for the reservoir chamber.

In accordance with a sixth aspect of the present invention, the operating device according to the fifth aspect is configured so that the reservoir includes a reservoir lid attached to the base. The reservoir lid is closer to the mounting axis than the second pivot axis in the perpendicular direction as viewed along the first pivot axis.

With the operating device according to the sixth aspect, it is possible to utilize a space between the base and the mounting axis for the reservoir lid.

In accordance with a seventh aspect of the present invention, the operating device according to any one of the first to sixth aspects is configured so that the base has a first width defined in an axial direction with respect to the first pivot axis. The base has a symmetrical shape with respect to a first reference center plane defined to bisect the first width, the first reference center plane being perpendicular to the axial direction.

With the operating device according to the seventh aspect, it is possible to share the base as different types of operating devices such as right and left operating devices.

In accordance with an eighth aspect of the present invention, the operating device according to any one of the first to seventh aspects is configured so that the operating member has a second width defined in an axial direction with respect to the first pivot axis. The operating member has an asymmetrical shape with respect to a second reference center plane defined to bisect the second width, the second reference center plane being perpendicular to the axial direction.

With the operating device according to the eighth aspect, it is possible to make the shape of the operating member suitable for shape and/or size of the user's hand.

In accordance with a ninth aspect of the present invention, the operating device according to any one of the first to eighth aspects is configured so that the operating member includes a cam surface. The intermediate member includes a follower configured to contact the cam surface to pivot about the second pivot axis in response to the pivotal movement of the operating member.

With the operating device according to the ninth aspect, it is possible to transmit the pivotal movement of the operating member to the piston via the intermediate member.

In accordance with a tenth aspect of the present invention, the operating device according to the ninth aspect is configured so that the operating member is pivotable relative to the base about the first pivot axis between a rest position and an operated position. The cam surface is configured to change a ratio of a stroke of the piston to a pivot angle of the operating member while the operating member is pivoted from the rest position toward the operated position.

With the operating device according to the tenth aspect, it is possible to make a movement of the piston suitable for the operating device and/or an operated device configured to be operated using the operating device.

In accordance with an eleventh aspect of the present invention, the operating device according to the ninth or tenth aspect is configured so that the cam surface is configured to decrease the ratio of the stroke of the piston to the pivot angle of the operating member while the operating member is pivoted from the rest position toward the operated position.

With the operating device according to the eleventh aspect, it is possible to make the movement of the piston more suitable for the operating device and/or the operated device configured to be operated using the operating device. For example, in a case where the operated device is a brake device, it is possible to reduce a speed of friction members of the brake device immediately before the friction members contact a movable member such as a wheel.

In accordance with a twelfth aspect of the present invention, the operating device according to any one of the ninth to eleventh aspects is configured so that the first pivot axis is closer to the mounting axis in the perpendicular direction than a contact part at which the follower contacts the cam surface as viewed along the first pivot axis.

With the operating device according to the twelfth aspect, it is possible to put the first pivot axis reliably closer to the mounting axis in the perpendicular direction. Thus, it is possible to make the movement of the operating member reliably suitable for the movement of user's fingers, improving operability of the operating device.

In accordance with a thirteenth aspect of the present invention, the operating device according to any one of the ninth to twelfth aspects is configured so that the intermediate member includes an intermediate body. The follower is rotatably coupled to the intermediate body about a rotational axis. The first pivot axis is closer to the mounting axis than the rotational axis in the perpendicular direction as viewed along the first pivot axis.

With the operating device according to the thirteenth aspect, it is possible to put the first pivot axis reliably closer to the mounting axis in the perpendicular direction. Thus, it is possible to make the movement of the operating member reliably suitable for the movement of user's fingers, improving operability of the operating device.

In accordance with a fourteenth aspect of the present invention, the operating device according to the thirteenth aspect is configured so that the rotational axis is positioned on a referential axis parallel to the mounting axis as viewed along the first pivot axis. The second pivot axis is closer to the referential axis than the first pivot axis in the perpendicular direction as viewed along the first pivot axis.

With the operating device according to the fourteenth aspect, it is possible to put the first pivot axis reliably closer to the mounting axis than the second pivot axis in the perpendicular direction. Thus, it is possible to make the movement of the operating member reliably suitable for the movement of user's fingers, improving operability of the operating device.

In accordance with a fifteenth aspect of the present invention, the operating device according to the fourteenth aspect is configured so that the referential axis is configured to move away from the first pivot axis while the operating member is pivoted from the rest position toward the operated position.

With the operating device according to the fifteenth aspect, it is possible to enlarge a travel range of the follower while the first pivot axis is closer to the mounting axis in the perpendicular direction. Thus, it is possible to improve a design freedom of the operating device while it is possible to improve operability of the operating device.

In accordance with a sixteenth aspect of the present invention, the operating device according to any one of the thirteenth to fifteenth aspects is configured so that the hole has a cylinder axis and extends along the cylinder axis. The rotational axis is configured to move toward the cylinder axis while the operating member is pivoted from the rest position toward the operated position.

With the operating device according to the sixteenth aspect, it is possible to enlarge a travel range of the follower while the first pivot axis is closer to the mounting axis in the perpendicular direction. Thus, it is possible to improve a design freedom of the operating device while it is possible to improve operability of the operating device.

In accordance with a seventeenth aspect of the present invention, the operating device according to any one of the tenth to sixteenth aspects is configured so that the cam surface includes a convex curved surface.

With the operating device according to the seventeenth aspect, it is possible to smoothly guide the intermediate member along the convex curved surface.

In accordance with an eighteenth aspect of the present invention, the operating device according to any one of the first to seventeenth aspects is configured so that the second pivot axis is defined along the first pivot axis.

With the operating device according to the eighteenth aspect, it is possible to improve cooperative movement of the operating member and the intermediate member.

In accordance with a nineteenth aspect of the present invention, the operating device according to any one of the first to eighteenth aspects is configured so that the second pivot axis is parallel to the first pivot axis.

With the operating device according to the nineteenth aspect, it is possible to reliably improve cooperative movement of the operating member and the intermediate member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiment(s) will now be described with reference to the accompanying drawings, wherein like reference numerals designate corresponding or identical elements throughout the various drawings.

Figure 1:
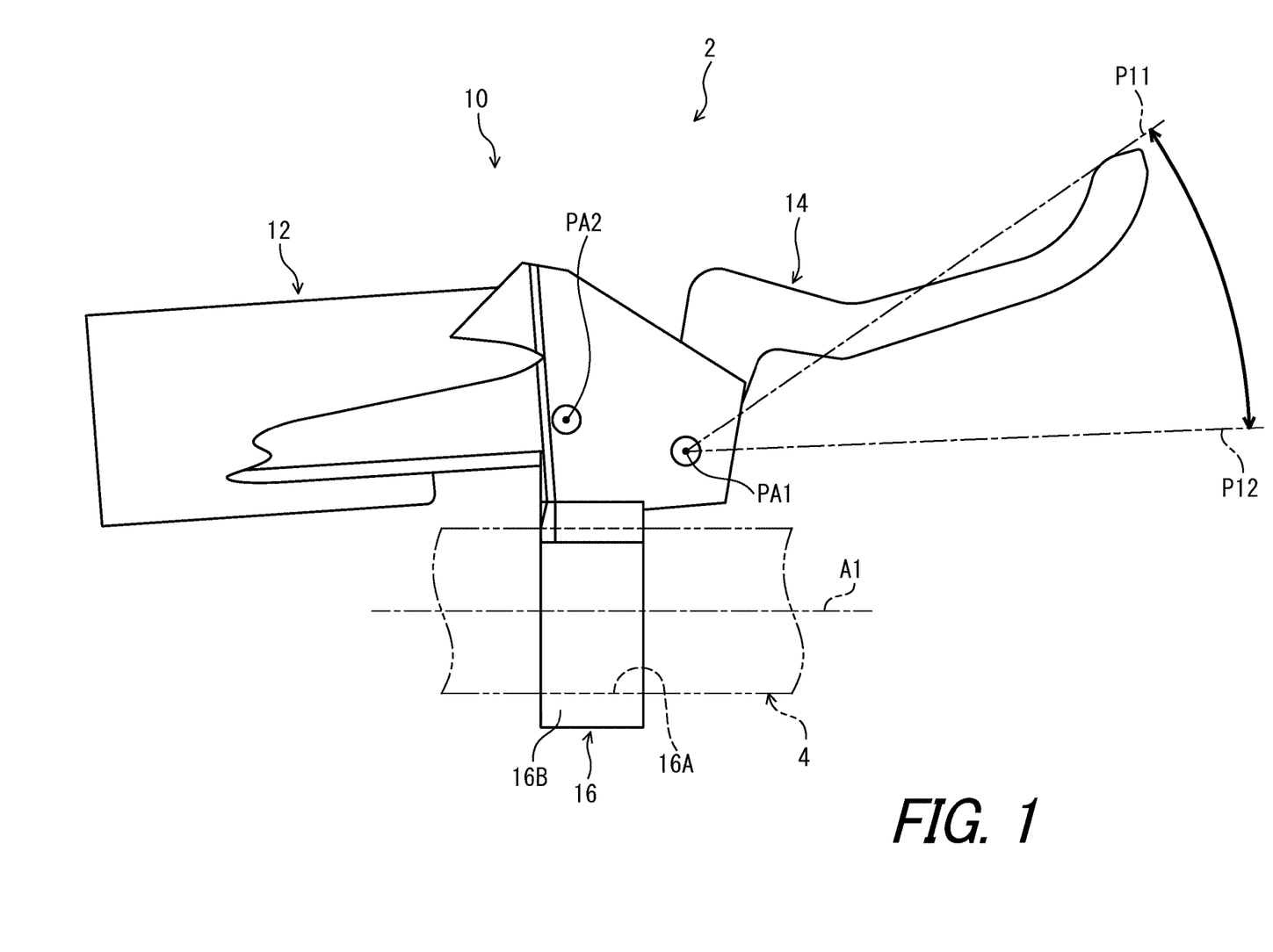
FIG. 1 is a top view of an operating device in accordance with an embodiment.

As seen in FIG. 1, an operating device 10 for a human-powered vehicle 2 comprises a base 12, an operating member 14, and a mounting structure 16. The operating member 14 is pivotally coupled to the base 12 about a first pivot axis PA1. The operating member 14 is pivotable relative to the base 12 about the first pivot axis PA1 between a rest position P11 and an operated position P12.

The mounting structure 16 is configured to couple the base 12 and a handlebar 4 of the human-powered vehicle 2. In the present embodiment, the mounting structure 16 is at least partially provided integrally with the base 12. However, the mounting structure 16 can be at least partially separate from the base 12 if needed and/or desired.

The mounting structure 16 defines a mounting axis A1 extending along the handlebar 4 in a mounting state where the mounting structure 16 couples the base 12 and the handlebar 4. The mounting structure 16 includes a mounting opening 16A through which the handlebar 4 is to extend in the mounting state. In the present embodiment, the mounting opening 16A has the mounting axis A1. The mounting structure 16 includes a clamp 16B defining the mounting opening 16A. However, the mounting structure 16 can have shapes other than the clamp 16B if needed and/or desired.

In the present application, a human-powered vehicle is a vehicle to travel with a motive power including at least a human power of a user who rides the human-powered vehicle (i.e., rider). The human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

Figure 2:
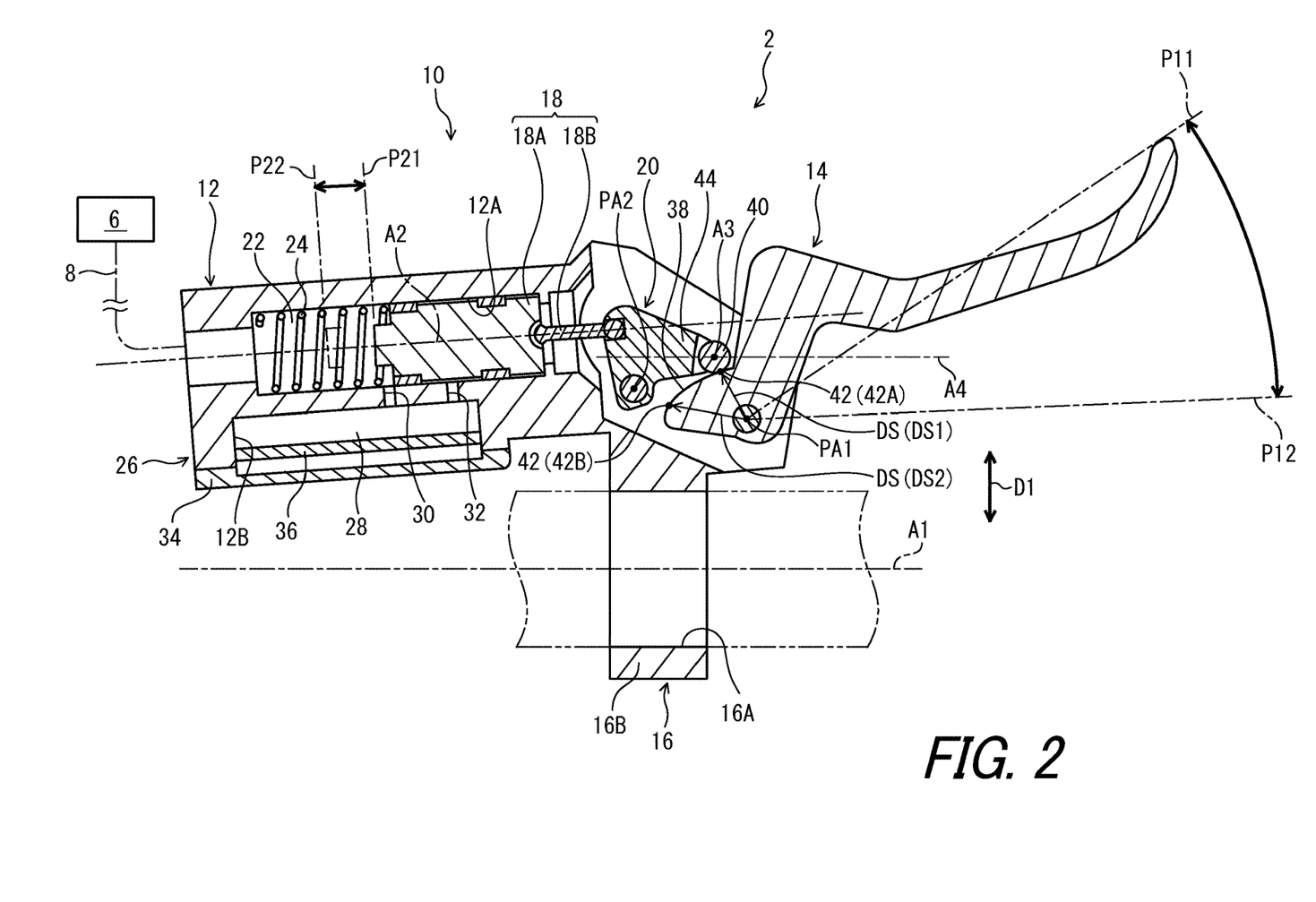
FIG. 2 is a cross-sectional view of the operating device taken along line II-II of FIG. 3.

As seen in FIG. 2, the operating device 10 for the human-powered vehicle 2 comprises a piston 18 and an intermediate member 20. The base 12 includes a hole 12A. The hole 12A has a cylinder axis A2 and extends along the cylinder axis A2. The piston 18 is movably provided in the hole 12A. The intermediate member 20 is pivotally coupled to the base 12 about a second pivot axis PA2 to transmit a pivotal movement of the operating member 14 to the piston 18. The piston 18 is movable relative to the base 12 between an initial position P21 and an actuated position P22 in response to the pivotal movement of the operating member 14 between the rest position P11 and the operated position P12.

The base 12 and the piston 18 define a hydraulic chamber 22 in the hole 12A. The hydraulic chamber 22 is configured to be connected to a hydraulic device 6 with a hydraulic hose 8. The hydraulic chamber 22 is configured to supply a hydraulic pressure to the hydraulic device 6 via the hydraulic hose 8 when the piston 18 is moved from the initial position P21 toward the actuated position P22 in response to the pivotal movement of the operating member 14. The operating device 10 comprises a biasing member 24. The biasing member 24 is provided in the hole 12A to bias the piston 18 toward the initial position P21.

The piston 18 includes a piston body 18A and a piston rod 18B. The piston rod 18B is provided between the piston body 18A and the intermediate member 20 to operatively couple the piston body 18A and the intermediate member 20.

As seen in FIG. 2, the first pivot axis PA1 is closer to the mounting axis A1 than the second pivot axis PA2 in a perpendicular direction D1 perpendicular to the mounting axis A1 as viewed along the first pivot axis PA1. In the present embodiment, the first pivot axis PA1 is provided between the mounting axis A1 and the cylinder axis A2 of the hole 12A as viewed along the first pivot axis PA1. The second pivot axis PA2 is provided between the mounting axis A1 and the cylinder axis A2 of the hole 12A as viewed along the first pivot axis PA1. The cylinder axis A2 is inclined relative to the mounting axis A1 as viewed along the first pivot axis PA1.

However, the first pivot axis PA1 can be provided outside a region defined between the mounting axis A1 and the cylinder axis A2 of the hole 12A as viewed along the first pivot axis PA1 if needed and/or desired. The second pivot axis PA2 can be provided outside a region defined between the mounting axis A1 and the cylinder axis A2 of the hole 12A as viewed along the first pivot axis PA1 if needed and/or desired. The cylinder axis A2 can be parallel or perpendicular to the mounting axis A1 as viewed along the first pivot axis PA1 if needed and/or desired.

The operating device 10 further comprises a reservoir 26. The reservoir 26 includes a reservoir chamber 28. The reservoir chamber 28 is configured to be in communication with the hydraulic chamber 22.

In the present embodiment, the base 12 includes a first hole 30 and a second hole 32. The first hole 30 is configured to connect the hydraulic chamber 22 and the reservoir chamber 28 in a state where the piston 18 is in the initial position P21. The piston 18 is configured to close the first hole 30 to block the communication between the hydraulic chamber 22 and the reservoir chamber 28 when the piston 18 is moved toward the actuated position P22. The second hole 32 is configured to connect the reservoir chamber 28 and a space defined between the piston 18 and an inner peripheral surface of the hole 12A regardless of the movement of the piston 18.

The reservoir 26 includes a reservoir lid 34 attached to the base 12. The reservoir 26 includes a diaphragm 36. The base 12 includes a recess 12B. The diaphragm 36 is provided in the recess 12B to define the reservoir chamber 28. The reservoir lid 34 is attached to the base 12 to fasten the diaphragm 36 to the base 12.

In the present embodiment, the reservoir chamber 28 is closer to the mounting axis A1 than the hydraulic chamber 22 in the perpendicular direction D1 as viewed along the first pivot axis PA1. The reservoir lid 34 is closer to the mounting axis A1 than the second pivot axis PA2 in the perpendicular direction D1 as viewed along the first pivot axis PA1.

However, the reservoir chamber 28 can be farther from the mounting axis A1 than the hydraulic chamber 22 in the perpendicular direction D1 as viewed along the first pivot axis PA1 if needed and/or desired. The reservoir chamber 28 can be provided in the same position as a position of the hydraulic chamber 22 in the perpendicular direction D1 as viewed along the first pivot axis PA1 if needed and/or desired. The reservoir lid 34 can be farther from the mounting axis A1 than the second pivot axis PA2 in the perpendicular direction D1 as viewed along the first pivot axis PA1 if needed and/or desired. The reservoir lid 34 can be provided in the same position as a position of the second pivot axis PA2 in the perpendicular direction D1 as viewed along the first pivot axis PA1 if needed and/or desired.

As seen in FIG. 2, the operating member 14 includes a cam surface 38. The intermediate member 20 includes a follower 40 configured to contact the cam surface 38 to pivot about the second pivot axis PA2 in response to the pivotal movement of the operating member 14.

In the present embodiment, the cam surface 38 is configured to change a ratio of a stroke of the piston 18 to a pivot angle of the operating member 14 while the operating member 14 is pivoted from the rest position P11 toward the operated position P12. The cam surface 38 is configured to decrease the ratio of the stroke of the piston 18 to the pivot angle of the operating member 14 while the operating member 14 is pivoted from the rest position P11 toward the operated position P12.

However, the cam surface 38 can be configured to increase the ratio of the stroke of the piston 18 to the pivot angle of the operating member 14 while the operating member 14 is pivoted from the rest position P11 toward the operated position P12 if needed and/or desired. The cam surface 38 can be configured not to change the ratio of the stroke of the piston 18 to the pivot angle of the operating member 14 while the operating member 14 is pivoted from the rest position P11 toward the operated position P12 if needed and/or desired.

In the present embodiment, the first pivot axis PA1 is closer to the mounting axis A1 in the perpendicular direction D1 than a contact part 42 at which the follower 40 contacts the cam surface 38 as viewed along the first pivot axis PA1. However, the first pivot axis PA1 can be farther from the mounting axis A1 in the perpendicular direction D1 than the contact part 42 at which the follower 40 contacts the cam surface 38 as viewed along the first pivot axis PA1 if needed and/or desired. The first pivot axis PA1 can be provided in the same position as a position of the contact part 42 in the perpendicular direction D1 as viewed along the first pivot axis PA1 if needed and/or desired.

In the present embodiment, the contact part 42 includes a first contact part 42A and a second contact part 42B. The follower 40 contacts the cam surface 38 at the first contact part 42A in a rest state where the operating member 14 is in the rest position P11. The follower 40 contacts the cam surface 38 at the second contact part 42B in an operated state where the operating member 14 is in the operated position P12.

A distance DS defined between the contact part 42 and the first pivot axis PA1 as viewed along the first pivot axis PA1. The distance DS includes a first distance DS1 and a second distance DS2. The first distance DS1 is defined between the first contact part 42A and the first pivot axis PA1 as viewed along the first pivot axis PA1. The second distance DS2 is defined between the second contact part 42B and the first pivot axis PA1 as viewed along the first pivot axis PA1. The second distance DS2 is longer than the first distance DS1.

The cam surface 38 includes a convex curved surface. The convex curved surface of the cam surface 38 is configured to increase the distance DS from the first distance DS1 to the second distance DS2. However, the cam surface 38 can have shapes other than the convex curved surface if needed and/or desired. The second distance DS2 can be equal to or shorter than the first distance DS1 if needed and/or desired.

The intermediate member 20 includes an intermediate body 44. The intermediate body 44 is pivotally coupled to the base 12 about the second pivot axis PA2. The follower 40 is rotatably coupled to the intermediate body 44 about a rotational axis A3. The rotational axis A3 is spaced apart from the first pivot axis PA1 and the second pivot axis PA2.

In the present embodiment, the first pivot axis PA1 is closer to the mounting axis A1 than the rotational axis A3 in the perpendicular direction D1 as viewed along the first pivot axis PA1. However, the first pivot axis PA1 can be farther from the mounting axis A1 than the rotational axis A3 in the perpendicular direction D1 as viewed along the first pivot axis PA1 if needed and/or desired. The first pivot axis PA1 can be provided in the same position as a position of the rotational axis A3 in the perpendicular direction D1 as viewed along the first pivot axis PA1 if needed and/or desired.

The rotational axis A3 is positioned on a referential axis A4 parallel to the mounting axis A1 as viewed along the first pivot axis PA1. In the present embodiment, the second pivot axis PA2 is closer to the referential axis A4 than the first pivot axis PA1 in the perpendicular direction D1 as viewed along the first pivot axis PA1. However, the second pivot axis PA2 can be farther from the referential axis A4 than the first pivot axis PA1 in the perpendicular direction D1 as viewed along the first pivot axis PA1 if needed and/or desired. The second pivot axis PA2 can be provided in the same position as a position of the first pivot axis PA1 in the perpendicular direction D1 as viewed along the first pivot axis PA1 if needed and/or desired.

In the present embodiment, the rotational axis A3 is configured to move away from the first pivot axis PA1 while the operating member 14 is pivoted from the rest position P11 toward the operated position P12. The referential axis A4 is configured to move away from the first pivot axis PA1 while the operating member 14 is pivoted from the rest position P11 toward the operated position P12.

The cam surface 38 of the operating member 14 is configured to guide the follower 40 of the intermediate member 20 such that the rotational axis A3 moves away from the first pivot axis PA1 while the operating member 14 is pivoted from the rest position P11 toward the operated position P12. The cam surface 38 of the operating member 14 is configured to guide the follower 40 of the intermediate member 20 such that the referential axis A4 moves away from the first pivot axis PA1 while the operating member 14 is pivoted from the rest position P11 toward the operated position P12.

However, the referential axis A4 can be configured to move toward the first pivot axis PA1 while the operating member 14 is pivoted from the rest position P11 toward the operated position P12 if needed and/or desired. The rotational axis A3 can be configured to move toward the first pivot axis PA1 while the operating member 14 is pivoted from the rest position P11 toward the operated position P12 if needed and/or desired.

In the present embodiment, the rotational axis A3 is configured to move toward the cylinder axis A2 while the operating member 14 is pivoted from the rest position P11 toward the operated position P12. The cam surface 38 of the operating member 14 is configured to guide the follower 40 of the intermediate member 20 such that the rotational axis A3 moves toward the cylinder axis A2 while the operating member 14 is pivoted from the rest position P11 toward the operated position P12. However, the rotational axis A3 can be configured to move away from the cylinder axis A2 while the operating member 14 is pivoted from the rest position P11 toward the operated position P12 if needed and/or desired.

Figure 3:
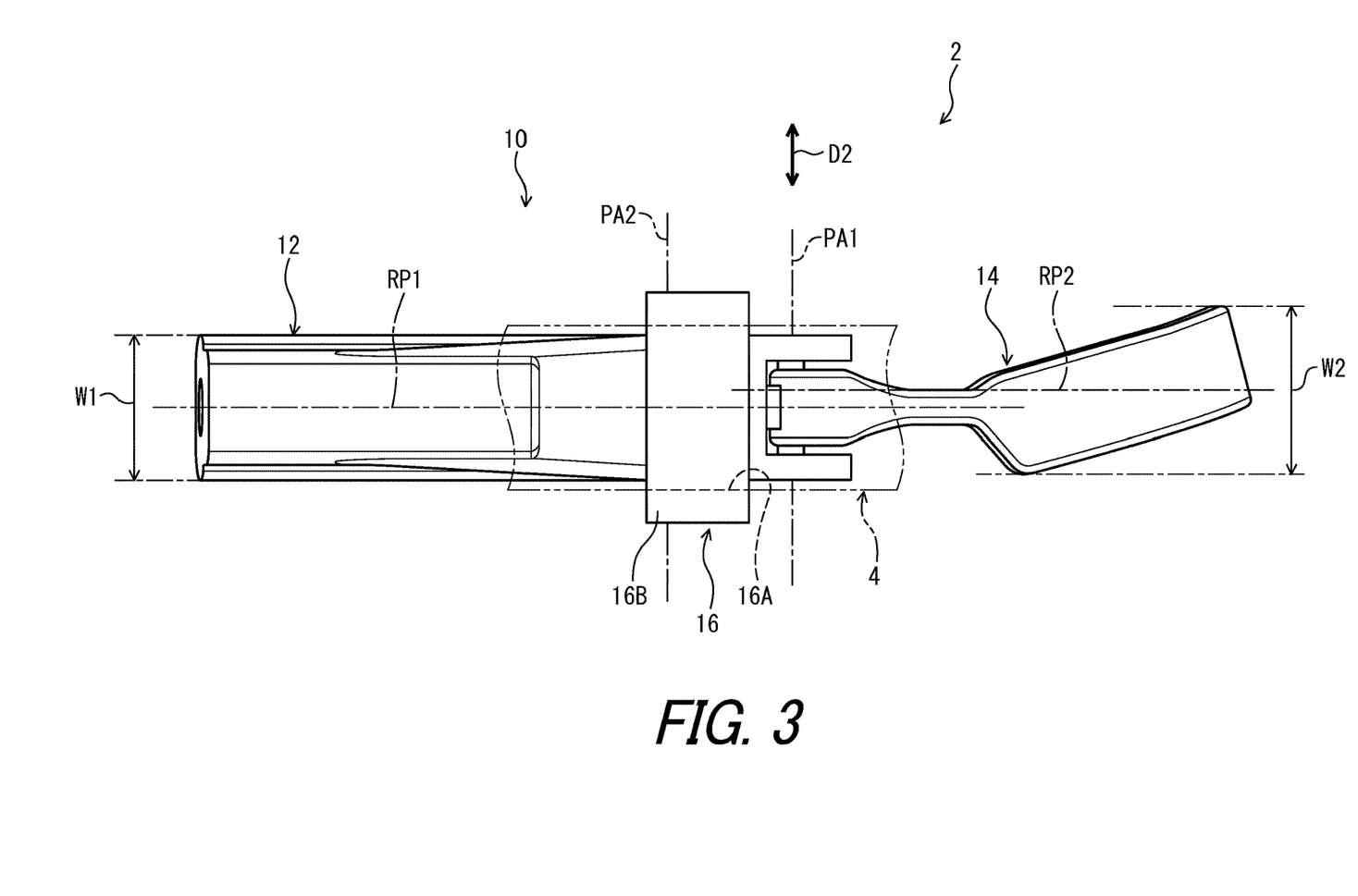
FIG. 3 is a side elevational view of the operating device illustrated in FIG. 1.
Figure 4:
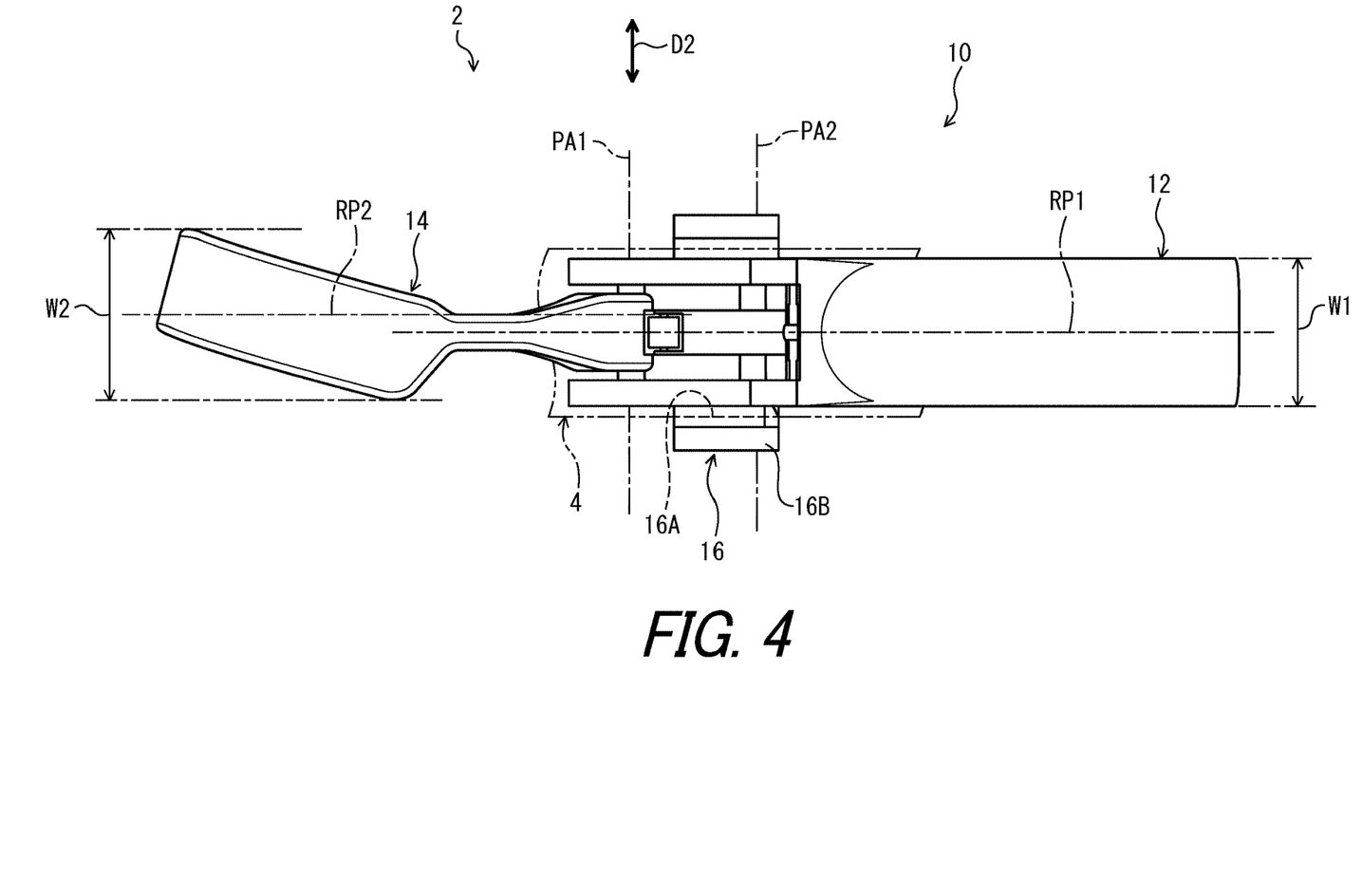
FIG. 4 is another side elevational view of the operating device illustrated in FIG. 1.
Figure 5:
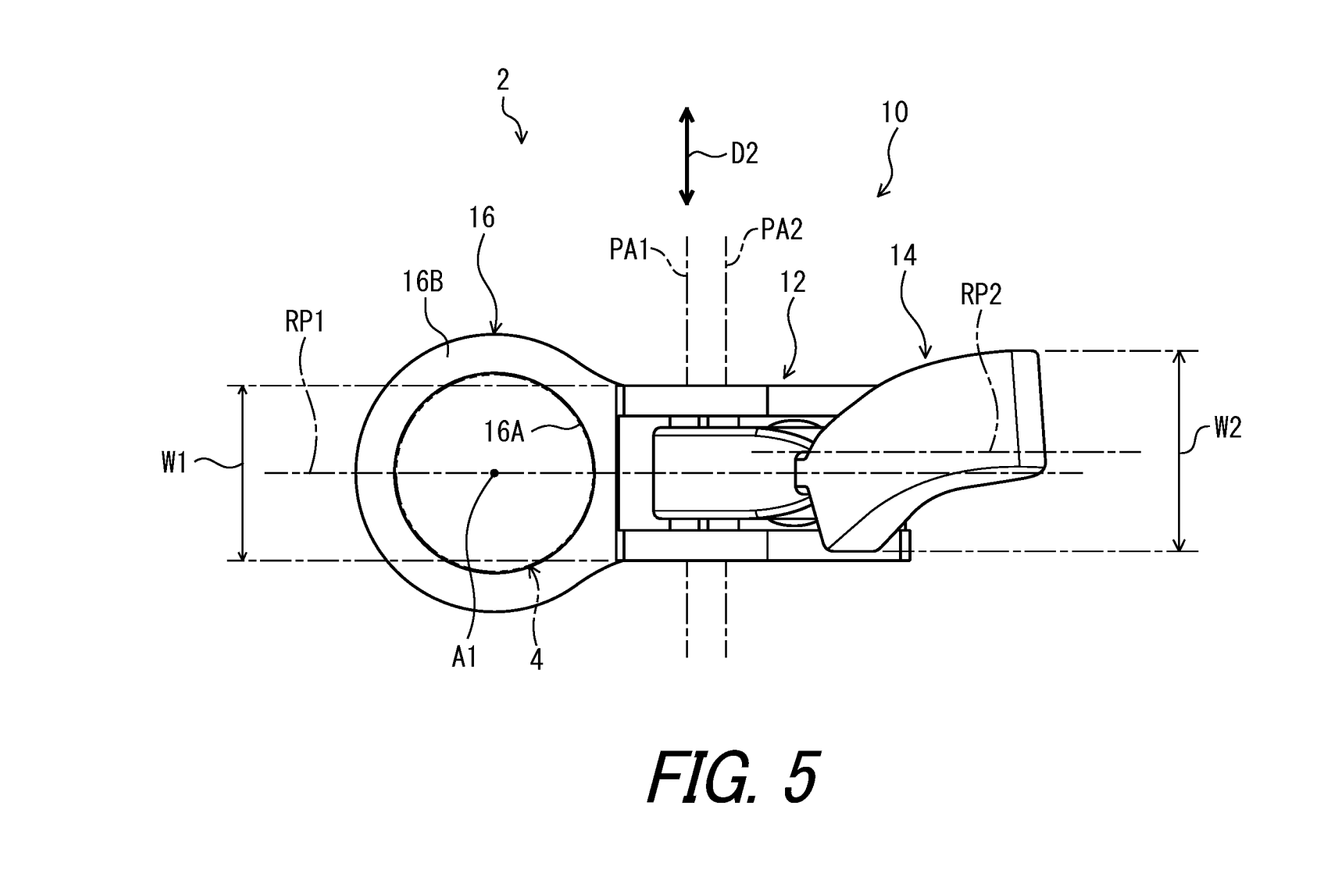
FIG. 5 is another side elevational view of the operating device illustrated in FIG. 1.
Figure 6:
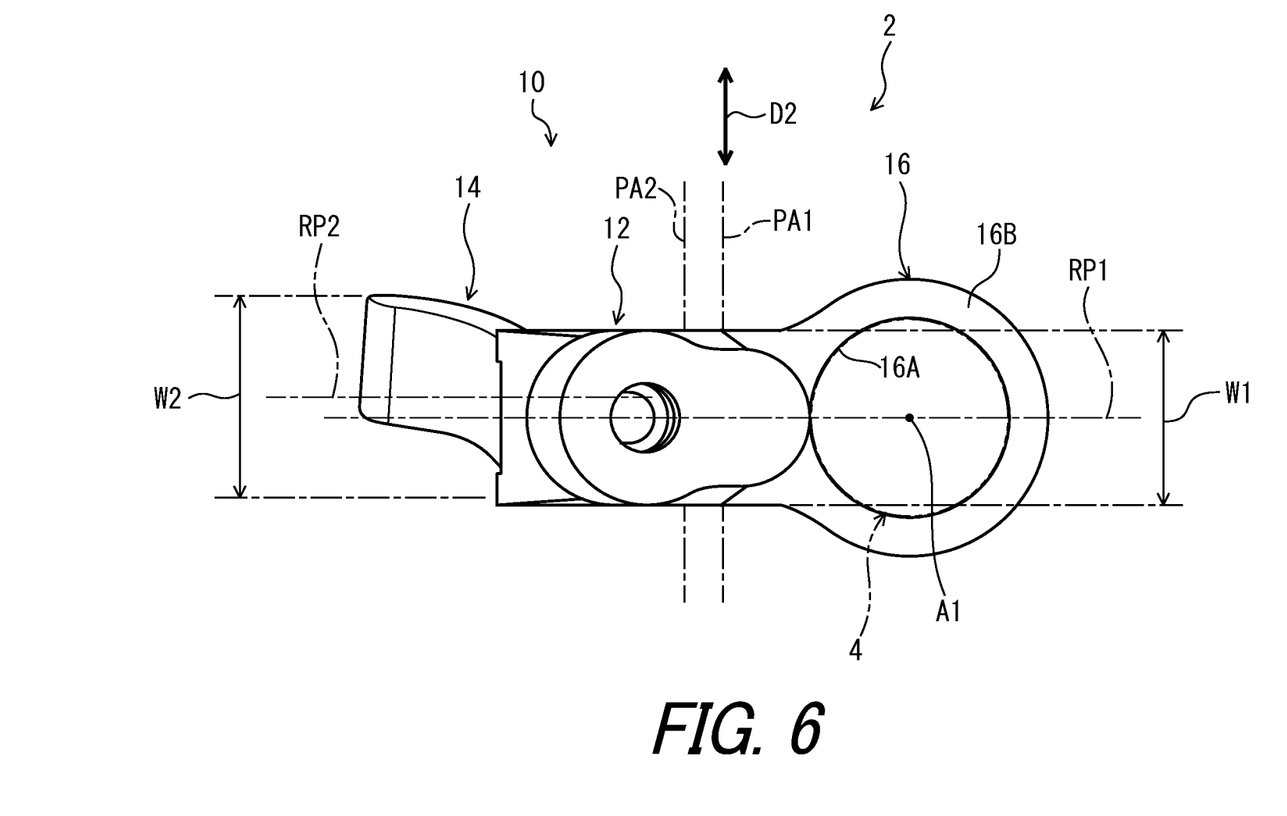
FIG. 6 is another side elevational view of the operating device illustrated in FIG. 1.

As seen in FIG. 3, the second pivot axis PA2 is defined along the first pivot axis PA1. The second pivot axis PA2 is parallel to the first pivot axis PA1. The rotational axis A3 is defined along the first pivot axis PA1. The rotational axis A3 is parallel to the first pivot axis PA1. However, the second pivot axis PA2 can be non-parallel to the first pivot axis PA1 if needed and/or desired. The rotational axis A3 can be non-parallel to the first pivot axis PA1 if needed and/or desired.

As seen in FIGS. 3 to 6, the base 12 has a first width W1 defined in an axial direction D2 with respect to the first pivot axis PA1. The axial direction D2 is parallel to the first pivot axis PA1. In the present embodiment, the base 12 has a symmetrical shape with respect to a first reference center plane RP1 defined to bisect the first width W1. The first reference center plane RP1 is perpendicular to the axial direction D2. However, the base 12 can have an asymmetrical shape with respect to the first reference center plane RP1 if needed and/or desired.

The operating member 14 has a second width W2 defined in an axial direction D2 with respect to the first pivot axis PA1. In the present embodiment, the operating member 14 has an asymmetrical shape with respect to a second reference center plane RP2 defined to bisect the second width W2. The second reference center plane RP2 is perpendicular to the axial direction D2. However, the operating member 14 can have a symmetrical shape with respect to the second reference center plane RP2 if needed and/or desired.

The second reference center plane RP2 is offset from the first reference center plane RP1 in the axial direction D2. However, the second reference center plane RP2 can be provided in the same position as the position of the first reference center plane RP1 in the axial direction D2 if needed and/or desired.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the tem "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An operating device for a human-powered vehicle, the operating device comprising:
   a base including a hole;
   a piston movably provided in the hole;
   an operating member pivotally coupled to the base about a first pivot axis;
   an intermediate member pivotally coupled to the base about a second pivot axis to transmit a pivotal movement of the operating member to the piston;
   a mounting structure configured to couple the base and a handlebar of the human-powered vehicle, the mounting structure defining a mounting axis extending along the handlebar in a mounting state where the mounting structure couples the base and the handlebar; and
   the first pivot axis being closer to the mounting axis than the second pivot axis in a perpendicular direction perpendicular to the mounting axis as viewed along the first pivot axis.

2. The operating device according to claim 1, wherein the hole has a cylinder axis and extends along the cylinder axis, and
   the first pivot axis is provided between the mounting axis and the cylinder axis of the hole as viewed along the first pivot axis.

3. The operating device according to claim 1, wherein the hole has a cylinder axis and extends along the cylinder axis, and
   the second pivot axis is provided between the mounting axis and the cylinder axis of the hole as viewed along the first pivot axis.

4. The operating device according to claim 1, wherein the hole has a cylinder axis and extends along the cylinder axis, and
   the cylinder axis is inclined relative to the mounting axis as viewed along the first pivot axis.

5. The operating device according to claim 1, further comprising
   a reservoir including a reservoir chamber, wherein
   the base and the piston define a hydraulic chamber in the hole,
   the reservoir chamber is configured to be in communication with the hydraulic chamber, and the reservoir chamber is closer to the mounting axis than the hydraulic chamber in the perpendicular direction as viewed along the first pivot axis.

6. The operating device according to any claim 5, wherein the reservoir includes a reservoir lid attached to the base, and
the reservoir lid is closer to the mounting axis than the second pivot axis in the perpendicular direction as viewed along the first pivot axis.

7. The operating device according to claim 1, wherein the base has a first width defined in an axial direction with respect to the first pivot axis, and
the base has a symmetrical shape with respect to a first reference center plane defined to bisect the first width, the first reference center plane being perpendicular to the axial direction.

8. The operating device according to claim 1, wherein the operating member has a second width defined in an axial direction with respect to the first pivot axis, and
the operating member has an asymmetrical shape with respect to a second reference center plane defined to bisect the second width, the second reference center plane being perpendicular to the axial direction.

9. The operating device according to claim 1, wherein the operating member includes a cam surface, and
the intermediate member includes a follower configured to contact the cam surface to pivot about the second pivot axis in response to the pivotal movement of the operating member.

10. The operating device according to claim 9, wherein the operating member is pivotable relative to the base about the first pivot axis between a rest position and an operated position, and
the cam surface is configured to change a ratio of a stroke of the piston to a pivot angle of the operating member while the operating member is pivoted from the rest position toward the operated position.

11. The operating device according to claim 10, wherein the cam surface includes a convex curved surface.

12. The operating device according to claim 10, wherein the cam surface is configured to decrease the ratio of the stroke of the piston to the pivot angle of the operating member while the operating member is pivoted from the rest position toward the operated position.

13. The operating device according to claim 9, wherein the first pivot axis is closer to the mounting axis in the perpendicular direction than a contact part at which the follower contacts the cam surface as viewed along the first pivot axis.

14. The operating device according to claim 9, wherein the intermediate member includes an intermediate body,
the follower is rotatably coupled to the intermediate body about a rotational axis, and
the first pivot axis is closer to the mounting axis than the rotational axis in the perpendicular direction as viewed along the first pivot axis.

15. The operating device according to claim 14, wherein the rotational axis is positioned on a referential axis parallel to the mounting axis as viewed along the first pivot axis, and
the second pivot axis is closer to the referential axis than the first pivot axis in the perpendicular direction as viewed along the first pivot axis.

16. The operating device according to claim 15, wherein the referential axis is configured to move away from the first pivot axis while the operating member is pivoted from a rest position toward an operated position.

17. The operating device according to claim 14, wherein the hole has a cylinder axis and extends along the cylinder axis, and
the rotational axis is configured to move toward the cylinder axis while the operating member is pivoted from a rest position toward an operated position.

18. The operating device according to claim 1, wherein the second pivot axis is defined along the first pivot axis.

19. The operating device according to claim 1, wherein the second pivot axis is parallel to the first pivot axis.

* * * * *